(12) United States Patent
Morris

(10) Patent No.: US 8,396,177 B1
(45) Date of Patent: Mar. 12, 2013

(54) INTERFERENCE CARRIER REGENERATION AND INTERFERENCE CANCELLATION APPARATUS AND METHODS

(75) Inventor: Keith Morris, Arnprior (CA)

(73) Assignee: Dragonwave, Inc., Kanata, On (CA)

( * ) Notice: Subject to any disclaimer, the term of this patent is extended or adjusted under 35 U.S.C. 154(b) by 372 days.

(21) Appl. No.: 12/875,315

(22) Filed: Sep. 3, 2010

(51) Int. Cl.
H03D 1/04 (2006.01)

(52) U.S. Cl. .......................... 375/346; 375/229

(58) Field of Classification Search .......... 375/346, 375/285, 267, 229, 347, 345, 355
See application file for complete search history.

(56) References Cited

U.S. PATENT DOCUMENTS

| 4,644,562 | A | 2/1987 | Kavehrad et al. | |
|---|---|---|---|---|
| 5,844,950 | A * | 12/1998 | Aono et al. | 375/346 |
| 7,046,753 | B2 | 5/2006 | Resheff et al. | |
| 7,613,260 | B2 | 11/2009 | Eliaz et al. | |
| 2009/0143042 | A1 * | 6/2009 | Kawai | 455/296 |
| 2010/0290552 | A1 * | 11/2010 | Sasaki | 375/267 |
| 2011/0182344 | A1 * | 7/2011 | Rosenhouse et al. | 375/224 |

* cited by examiner

Primary Examiner — Emmanuel Bayard

(57) ABSTRACT

Interference carrier regeneration and interference cancellation involve generating a Cross Polarization Interference Cancellation (XPIC) error signal representative of a difference between a first signal derived from a first communication signal that is received over a wireless communication link and a first symbol decision that is based on the first signal. The first communication signal is affected by interference from a second communication signal, on an orthogonal polarization channel of the same nominal frequency channel, for example. Based on the XPIC error signal and a second symbol decision for the second communication signal, a carrier of interference affecting the first signal from the second communication signal is regenerated. A rotation and derotation arrangement rotates a cross-channel interference signal and derotates a main channel equalizer feedback signal based on the regenerated interference carrier. The derotated main channel equalizer feedback signal can be provided as a feedback signal to a cross-channel interference equalizer.

32 Claims, 8 Drawing Sheets

INTERFERENCE CARRIER REGENERATION AND INTERFERENCE CANCELLATION APPARATUS AND METHODS

FIELD OF THE INVENTION

This invention relates generally to communications and, in particular, to interference cancellation.

BACKGROUND

The capacity of a wireless communication link, also referred to herein as a radio link, can be doubled by combining two independent wireless transmitters through an Orthogonal Mode Transducer (OMT), transmitting channel carriers on orthogonal Horizontal (H) and Vertical (V) polarizations, and separating the H and V channels at a receive antenna with another OMT. The receive OMT connects to two separate radio receivers. Because of non-ideal OMT performance and properties of the propagation path, for example, there is some cross-coupling of the channels, which in turn causes cross-channel interference. Herein, "channel" is intended to convey the notion of one or the other of a pair of orthogonal polarization paths including transmitter, transmit antenna and OMT feed, propagation medium, receive antenna and OMT feed and the receiver, both channels operating on one nominal carrier frequency. When referring to a frequency channel as determined by a carrier frequency, the distinction from an orthogonal channel is made by using the term "frequency channel".

A Cross Polarization Interference Cancellation (XPIC) system can be used to cancel cross-channel interference. An adaptive equalizer algorithm, for example, could detect a correlation between the error caused by the interference on one receiver and the signal received at the other receiver, and generate an interference cancelling signal. If the two transmitters are independent, then the orthogonal channel carriers will have slightly different frequencies and phase noise sources. When the H receiver is synchronized with the H transmitter frequency and phase noise, the interference from the V transmitter appears with a frequency offset and phase noise that results from the frequency and phase noise differences between the two transmitters. The V receiver will see interference from the H transmitter with the inverse frequency offset and phase noise.

Acquiring and tracking this frequency offset can present challenges. An interference signal is generally weaker than a main received signal, and therefore tends to have a very low signal to noise ratio. A frequency offset tracking loop in an XPIC algorithm would then have to have a narrower bandwidth than a carrier recovery loop that is used in demodulating the main received signal. However, this significantly limits the ability of an XPIC algorithm to track both frequency offset and phase noise of interference signals.

Previous attempts to do this by rapid tracking of interference phase in each channel, such as in U.S. Pat. No. 7,046,753, supplement the intrinsic but necessarily slow ability of the XPIC control loop to follow the interference phase. It was subsequently found necessary to further control the parameters of this phase-tracking arrangement by devising an arrangement of master-slave phase-locked loops (PLLs) in each channel, as evidenced in U.S. Pat. No. 7,613,260.

Prior XPIC systems also sometimes suffer from a "deadzone" in their Error-Vector Magnitude (EVM), where EVM before interference cancellation is not large enough to lock a PLL which tracks its phase, but is large enough to cause data errors.

SUMMARY

In some embodiments, a carrier vector is extracted, from an interference signal which is affecting one communication signal channel, using symbols detected by a receiver on another channel as a reference. For example, a complex conjugate multiplication operation could be applied to symbol decisions of one receiver and error signals from the other receiver. This is a form of direct regeneration of the interference carrier, rather than an indirect tracking process that requires an acquisition process and can lose synchronization if the tracking requirements exceed the bandwidth of a tracking loop.

An extracted signal could be used to "derotate" an interference signal and allow an XPIC algorithm to work, without the need for explicit tracking of rotation of the interference carrier or an acquisition process to synchronize with the interference carrier.

According to an aspect of the invention, there is provided an apparatus including: an error signal generator to generate an XPIC error signal representative of a difference between a first signal that is derived from a first communication signal received over a wireless communication link and a first symbol decision that is based on the first signal, the first communication signal being affected by interference from a second communication signal, the first and second communication signals including symbols; and an interference carrier regenerator, operatively coupled to the error signal generator, to regenerate, based on the XPIC error signal and a second symbol decision for the second communication signal, a carrier of interference affecting the first signal from the second communication signal.

The apparatus could also include: an interference canceller to subtract an interference signal from the first signal; and an interference signal generator, operatively coupled to receive a cross-channel signal derived from the second communication signal, to rotate the cross-channel signal based on the regenerated interference carrier, and to provide the rotated cross-channel signal to the interference canceller as the interference signal.

In some embodiments, the apparatus includes: a first symbol detector, operatively coupled to the error signal generator, to generate the first symbol decision and to provide the first symbol decision to the error signal generator; and a second symbol detector, operatively coupled to the interference carrier regenerator, to generate the second symbol decision and to provide the second symbol decision to the error signal generator.

A main channel equalizer, operatively coupled to the interference canceller, might also be provided to derive the first signal from the first communication signal by performing main channel equalization of the first communication signal and to provide the first signal to the interference canceller.

Similarly, a cross-channel interference equalizer could be operatively coupled to the interference signal generator, to derive the cross-channel signal from the second communication signal by performing cross-channel equalization of the second communication signal and to provide the cross-channel signal to the interference signal generator.

A main channel feedback signal generator could be operatively coupled to receive the first symbol decision and an output of the interference canceller and to provide to the main channel equalizer a main channel feedback signal representative of a difference between the output of the interference canceller and the first symbol decision. A cross-channel feedback signal generator, operatively coupled to receive the main channel feedback signal and to derotate the main channel feedback signal based on the regenerated interference carrier, could be used to provide the derotated main channel feedback signal to the cross-channel interference equalizer as a cross-channel feedback signal.

In some embodiments, the apparatus includes: a second error signal generator to generate a second XPIC error signal representative of a difference between a second signal that is derived from the second communication signal and a second symbol decision that is based on the second signal, the second communication signal being affected by interference from the first communication signal; and a second interference carrier regenerator, operatively coupled to the second error signal generator, to regenerate, based on the second XPIC error signal and the first symbol decision, a second carrier of interference affecting the second signal from the first communication signal.

A second interference canceller to subtract a second interference signal from the second signal; and a second interference signal generator, operatively coupled to receive a second cross-channel signal derived from the first communication signal, to rotate the second cross-channel signal based on the regenerated second interference carrier, and to provide the rotated second cross-channel signal to the second interference canceller as the second interference signal, could also be implemented in such an apparatus.

The first symbol detector and the second symbol detector noted above could also be operatively coupled to the second interference carrier regenerator and to the second error signal generator.

A second main channel equalizer could be operatively coupled to the second interference canceller, to derive the second signal from the second communication signal by performing main channel equalization of the second communication signal and to provide the second signal to the second interference canceller. A second cross-channel interference equalizer could similarly be operatively coupled to the second interference signal generator, to derive the second cross-channel signal from the first communication signal by performing cross-channel equalization of the first communication signal and to provide the second cross-channel signal to the second interference signal generator.

For equalizer feedback, a second main channel feedback signal generator could be operatively coupled to receive the second symbol decision and an output of the second interference canceller and to provide to the second main channel equalizer a second main channel feedback signal representative of a difference between the output of the second interference canceller and the second symbol decision, and a second cross-channel feedback signal generator could be operatively coupled to receive the second main channel feedback signal, to derotate the second main channel feedback signal based on the regenerated second interference carrier, and to provide the derotated second main channel feedback signal to the second cross-channel interference equalizer as a second cross-channel feedback signal.

The first communication signal and the second communication signal are signals on respective orthogonal polarizations of the same nominal frequency channel of the wireless communication link in some embodiments.

The interference carrier regenerator might regenerate the interference carrier from a product of the XPIC error signal and the complex reciprocal of the second symbol decision, and the second interference carrier regenerator could similarly regenerate the second interference carrier from a product of the second XPIC error signal and the complex reciprocal of the first symbol decision.

In another embodiment, the interference carrier regenerator regenerates the interference carrier from either a product of the XPIC error signal and the complex conjugate of the second symbol decision or a product of the second symbol decision and the complex conjugate of the XPIC error signal, and the second interference carrier regenerator regenerates the second interference carrier from either a product of the second XPIC error signal and the complex conjugate of the first symbol decision or a product of the first symbol decision and the complex conjugate of the second XPIC error signal, with the interference carrier regenerator and the second interference carrier regenerator respectively using the complex conjugates of the second symbol decision and the first symbol decision, or respectively using the complex conjugates of the XPIC error signal and the second XPIC error signal in regenerating the interference carrier and the second interference carrier.

The apparatus could also include: a complex conjugate adder operatively coupled to receive outputs of the interference carrier regenerator and the second interference carrier regenerator; a filter operatively coupled to receive an output of the complex conjugate adder; a phase detector operatively coupled to receive an output of the filter and to determine a phase associated with the filter output; and a converter operatively coupled to receive an output of the phase detector and to convert a phase from the phase detector output into a regenerated complex interference carrier and its complex conjugate. The complex conjugate adder adds the output of the interference carrier regenerator and the complex conjugate of the output of the second interference carrier regenerator, the converter provides the regenerated complex interference carrier as the interference carrier, and the converter provides the complex conjugate of the regenerated complex interference carrier as the second interference carrier where the interference carrier regenerator and the second interference carrier regenerator respectively use the complex conjugates of the second symbol decision and the first symbol decision. The complex conjugate adder adds the complex conjugate of the output of the interference carrier regenerator and the output of the second interference carrier regenerator, the converter provides the regenerated complex interference carrier as the interference carrier, and the converter provides the complex conjugate of the regenerated complex interference carrier as the second interference carrier where the interference carrier regenerator and the second interference carrier regenerator respectively use the complex conjugates of the XPIC error signal and the second XPIC error signal.

A method is also provided, and includes: generating an XPIC error signal representative of a difference between a first signal that is derived from a first communication signal received over a wireless communication link and a first symbol decision that is based on the first signal, the first communication signal being affected by interference from a second communication signal, the first and second communication signals comprising symbols; and regenerating, based on the XPIC error signal and a second symbol decision for the second communication signal, a carrier of interference affecting the first signal from the second communication signal.

The method could also include: rotating a cross-channel signal derived from the second communication signal based on the regenerated interference carrier; and subtracting the rotated cross-channel signal from the first signal.

In some embodiments, the method includes: performing main channel equalization of the first communication signal to derive the first signal from the first communication signal.

The method also involves performing cross-channel equalization of the second communication signal to derive the cross-channel signal from the second communication signal in some embodiments.

A main channel feedback signal, representative of a difference between a result of the subtracting and the first symbol decision, could be provided for the main channel equalization. The main channel feedback signal could be derotated based on the regenerated interference carrier and provided as a cross-channel feedback signal for the cross-channel equalization.

The method might also involve: generating a second XPIC error signal representative of a difference between a second signal that is derived from the second communication signal and a second symbol decision that is based on the second signal, the second communication signal being affected by interference from the first communication signal; and regenerating, based on the second XPIC error signal and the first symbol decision, a second carrier of interference affecting the second signal from the first communication signal.

A second cross-channel signal derived from the first communication signal could be based on the regenerated second interference carrier, in which case the method might involve subtracting the rotated second cross-channel signal from the second signal.

As for the first communication signal, main channel equalization of the second communication signal could be provided to derive the second signal from the second communication signal. Cross-channel equalization of the first communication signal could also be performed, to derive the second cross-channel signal from the first communication signal.

A second main channel feedback signal, representative of a difference between the second symbol decision and a result of subtracting the second interference signal from the second signal, could be provided for the main channel equalization of the second communication signal. The second main channel feedback signal could be rotated based on the regenerated second interference carrier, with the derotated second main channel feedback signal being provided as a second cross-channel feedback signal for the cross-channel equalization of the first communication signal.

In some embodiments, the regenerating of the interference carrier involves regenerating the interference carrier from a product of the XPIC error signal and the complex reciprocal of the second symbol decision, and the regenerating of the second interference carrier involves regenerating the second interference carrier from a product of the second XPIC error signal and the complex reciprocal of the first symbol decision.

Alternatively, the regenerating of the interference carrier could involve regenerating the interference carrier from either a product of the XPIC error signal and the complex conjugate of the second symbol decision or a product of the second symbol decision and the complex conjugate of the XPIC error signal, with the regenerating of the second interference carrier then involving regenerating the second interference carrier from either a product of the second XPIC error signal and the complex conjugate of the first symbol decision or a product of the first symbol decision and the complex conjugate of the second XPIC error signal. The regenerating of the interference carrier and the regenerating of the second interference carrier respectively use the complex conjugates of the second symbol decision and the first symbol decision, or respectively use the complex conjugates of the XPIC error signal and the second XPIC error signal.

According to a further aspect of the invention, an apparatus includes: a main channel adaptive equalizer for performing main channel equalization of a first communication signal on a first channel of a pair of orthogonal polarization channels; a cross-channel interference adaptive equalizer for performing cross-channel equalization of a second communication signal on a second channel of the pair of orthogonal polarization channels; an interference canceller operatively coupled to receive a main channel equalized signal from the main channel adaptive equalizer and to subtract an interference signal from the main channel equalized signal; a rotator operatively coupled to receive a cross-channel equalized signal from the cross-channel interference adaptive equalizer, to rotate the cross-channel equalized signal, and to provide the rotated cross-channel signal to the interference canceller as the interference signal; and a derotator operatively coupled to receive a main channel feedback signal that is provided to the main channel adaptive equalizer, to derotate the main channel feedback signal, and to provide the derotated main channel feedback signal to the cross-channel interference adaptive equalizer as a cross-channel feedback signal.

A related method involves: performing main channel equalization of a first communication signal on a first channel of a pair of orthogonal polarization channels to generate a main channel equalized signal; performing cross-channel equalization of a second communication signal on a second channel of the pair of orthogonal polarization channels to generate a cross-channel equalized signal; rotating the cross-channel equalized signal to generate an interference signal; subtracting the interference signal from the main channel equalized signal; derotating a main channel feedback signal that is provided to the main channel adaptive equalizer; and providing the derotated main channel feedback signal to the cross-channel interference adaptive equalizer as a cross-channel feedback signal.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION

Figure 1:
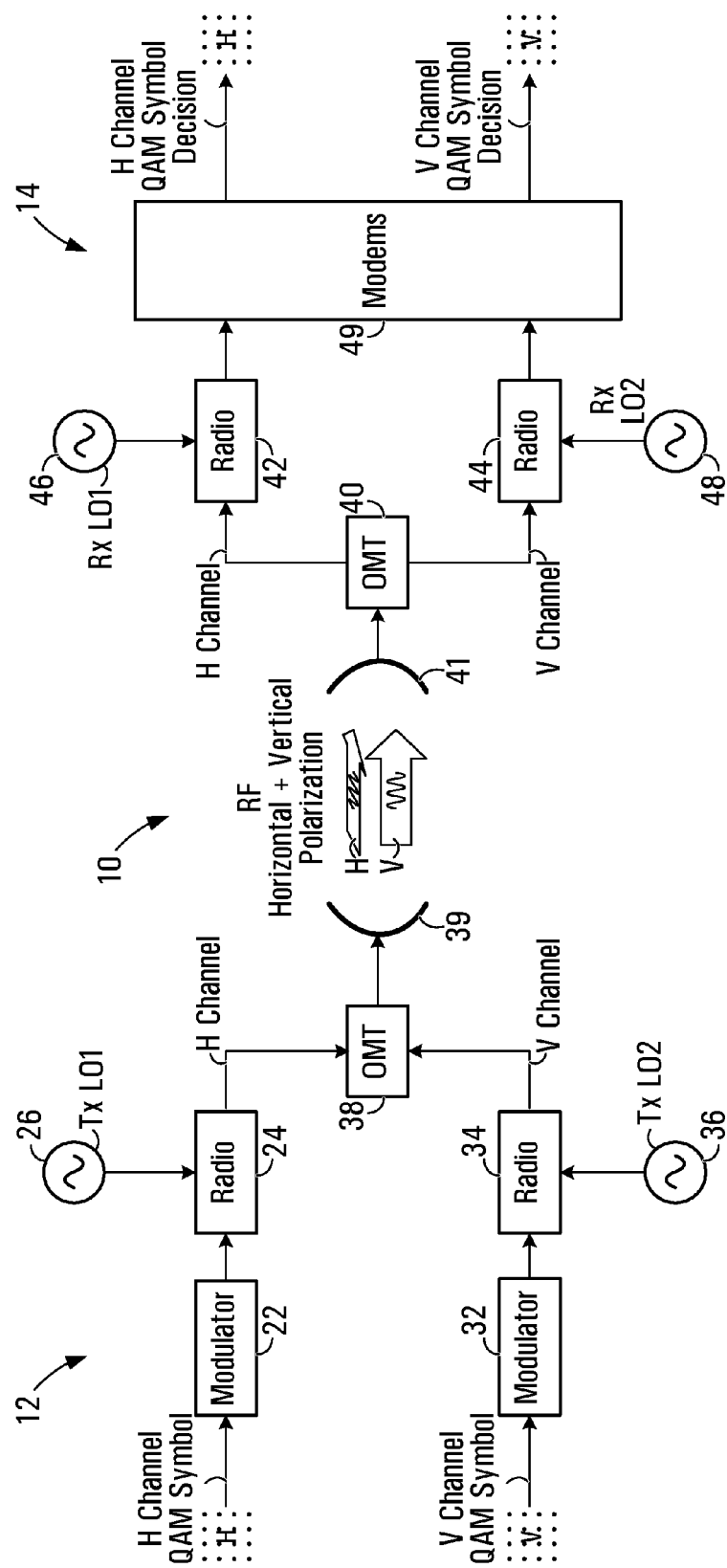
FIG. 1 is a block diagram illustrating a dual-polarization radio link and associated transmit and receive components.

FIG. 1 is a block diagram illustrating a dual-polarization radio link and associated transmit and receive components. The link itself is shown at 10, between a transmit side 12 and a receive side 14. The capacity of the link 10 is doubled by combining two independent radio transmitters 24, 34 through an OMT 38, transmitting on orthogonal H and V polarizations through a transmit antenna 39, and separating at the receive end antenna 41 with another OMT 40. The OMT 40 connects to separate radio receivers 42, 44. Each independent radio transmitter 24, 34 is also operatively coupled to a modulator 22, 32 and a Local Oscillator (LO) 26, 36. The receive end radios 42, 44 are similarly coupled to LOs 46, 48 and to modems 49, which would include two modems in the example shown. Although Quadrature Amplitude Modulation (QAM) symbols are used for communications on the wireless link 10, other modulation schemes are also possible.

Figure 2:
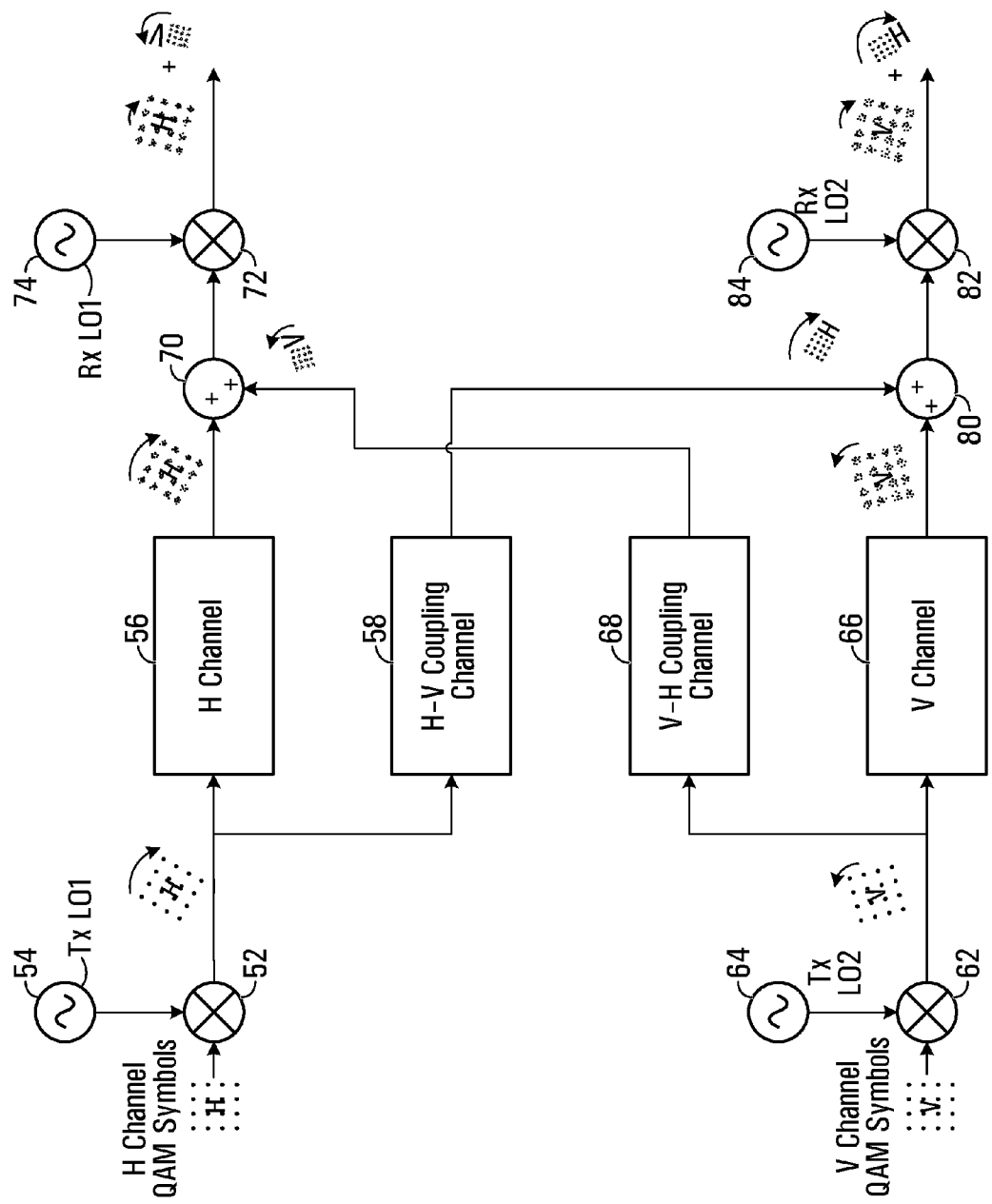
FIG. 2 is a block diagram illustrating channel cross-coupling on a radio link.

FIG. 2 is a block diagram illustrating channel cross-coupling on a radio link. Because of non-ideal OMTs 38, 40 (FIG. 1) and properties of the propagation path along the wireless link 10, there is some cross-coupling of the main channels, causing cross-channel interference. The LOs 54, 64, 74, 84 and the mixers 52, 62, 72, 82 represent independent transmitters and receivers. The main channels are represented in FIG. 2 at 56, 66, and cross-coupling between those channels is represented at 58, 68. Cross-channel interference affecting each main channel is represented by the combiners 70, 80. The arrows and rotation of the symbol constellations shown in FIG. 2 represent frequency offsets between the various carrier LOs 54, 64, 74, 84. XPIC techniques might be useful, for example, in this type of system.

It should also be appreciated that, in general, any two orthogonal channels operating on the same nominal frequency are candidates for the XPIC techniques disclosed herein. Therefore, although for ease of illustration the present disclosure refers primarily to horizontal (H) and vertical (V) polarization channels, this designation is intended to implicitly include left-hand circularly-polarized (LHCP) and right-hand circularly-polarized (RHCP) channels, +45 degree and −45 degree slant-polarized channels, and others as may be devised by those skilled in the art, the term "orthogonal" being meant in the linear-algebraic sense. Thus, the two channels are also referred to herein as the "main" channel and the "cross" channel for each polarization.

Figure 3:
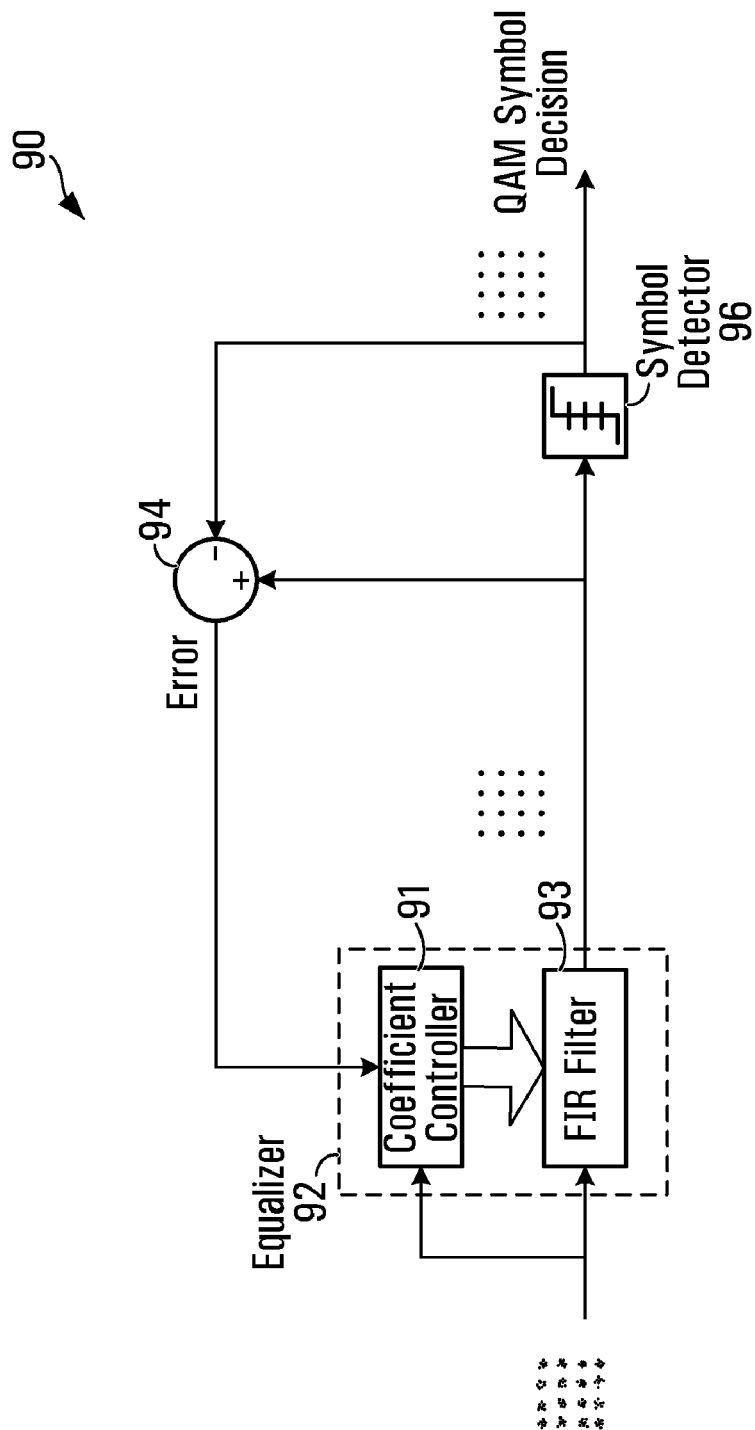
FIG. 3 is a block diagram of an adaptive equalizer.

FIG. 3 is a block diagram of an adaptive equalizer 90. Such an adaptive equalizer could form the basis of an XPIC system. The example adaptive equalizer 90 includes an equalizer 92, a QAM symbol detector 96 which makes decisions regarding received symbols, and a feedback signal generator in the form of a combiner 94 which provides an error signal to the equalizer 92. The equalizer 92 includes a Finite Impulse Response (FIR) filter 93, for which coefficients are generated based on the error signal and the input signal by a coefficient controller 91. One suitable and well-known algorithm for coefficient control is the Least Mean Squares (LMS) algorithm. The coefficient controller 91 is driven by the error between the equalized signal and actual symbol decisions from the symbol detector 96, and by the input signal.

Figure 4:
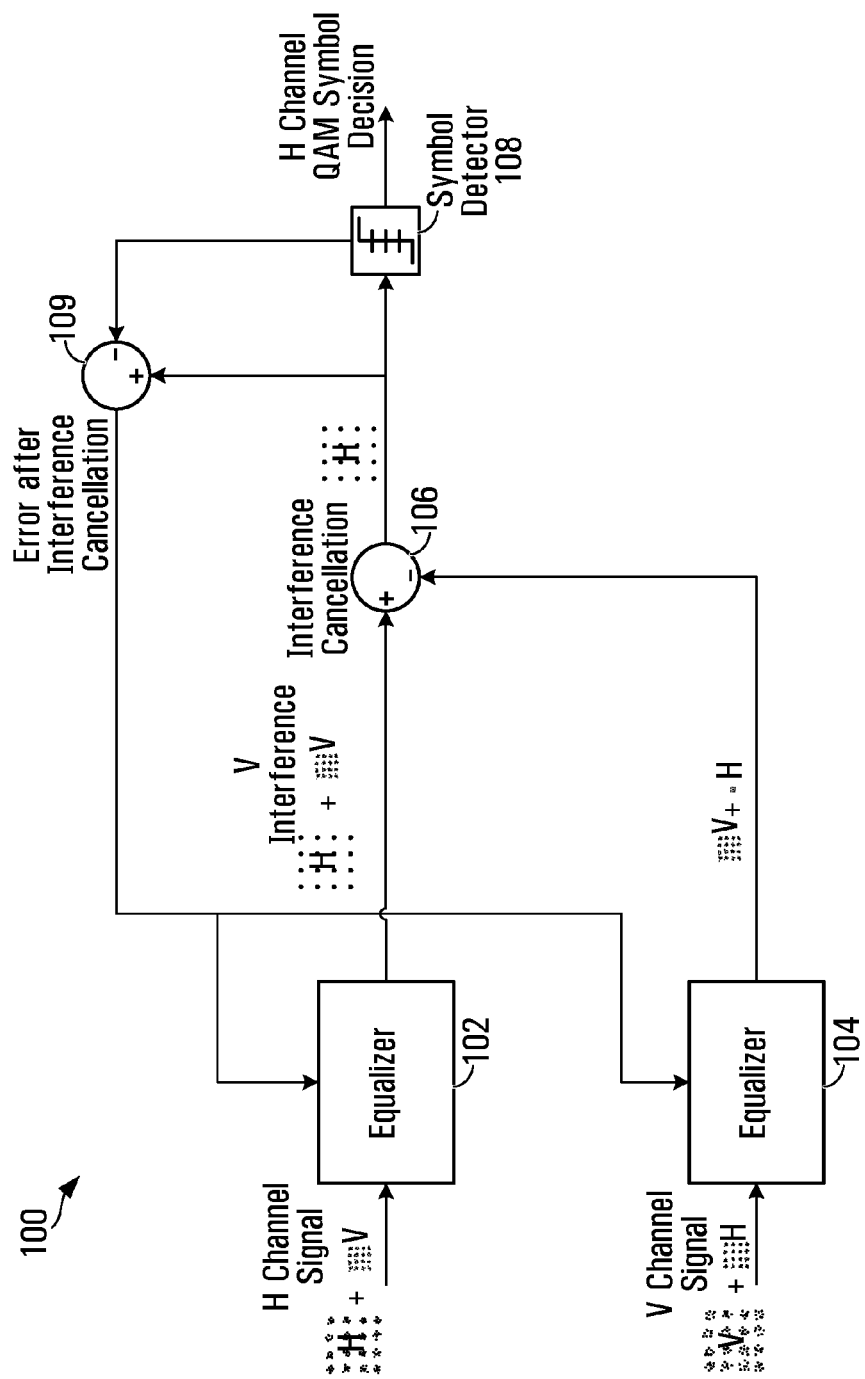
FIG. 4 is a block diagram of an adaptive equalizer which provides interference cancellation.

If a sample of an interfering signal is available, from the other receiver in a dual-polarization link implementation for instance, then that sample could be sent through a second equalizer, referred to herein as an interference equalizer, and combined with the output of the main equalizer 92. FIG. 4 is a block diagram of an adaptive equalizer 100 which provides interference cancellation in this manner. The example adaptive equalizer 100 includes a main channel equalizer 102, a cross-channel interference equalizer 104, an interference canceller in the form of a combiner 106, a symbol detector 108, and a feedback signal generator in the form of a combiner 109.

In FIG. 4, the H channel receiver has a cross-channel interferer from the V channel transmitter. The coefficient controllers in the main channel equalizer 102 and the cross-channel interference equalizer 104 can be driven by the same error signal so that the cross-channel interference equalizer coefficients adapt to minimize the error and shape the V channel signal to form a cancelling version of the V channel coupling interferer. This function of the cross-channel interference equalizer 104 is hereafter termed "cross-channel equalization".

There are four radio frequency sources in a dual-polarization radio link. In FIGS. 1 and 2, these are shown as Tx LO1 and Tx LO2 (the carriers of the communication signals on the wireless link), and Rx LO1 and Rx LO2, which are used to down convert the communication signals at the receive end. If the transmit and receive radios are independent, then these frequency sources will be at slightly different actual frequencies, although all four radio frequency sources operate on the same nominal frequency. In addition, they will have different phase noise sources. A carrier synchronization system is typically provided at the receive end to correct the frequency offset between the Tx and Rx LOs, and also to track the phase noise of sources of the Tx LOs (i.e., "derotating" the constellation in the case of QAM). The carrier synchronization system might be implemented, for example, as a phase locked loop (PLL), including a phase detector and loop filter driving the frequency control of a complex Numerically Controlled Oscillator (NCO) which has sine and cosine outputs.

However, as noted above, when the H receiver is synchronized with the H transmitter frequency and phase noise in a dual-polarization system, interference from the V transmitter appears with a frequency offset and phase noise that results from the frequency and phase noise differences between the Tx LOs. The V receiver will similarly see interference from the H transmitter, but with the inverse frequency offset and phase noise. Cancellation of such interference can therefore be difficult.

Figure 5:
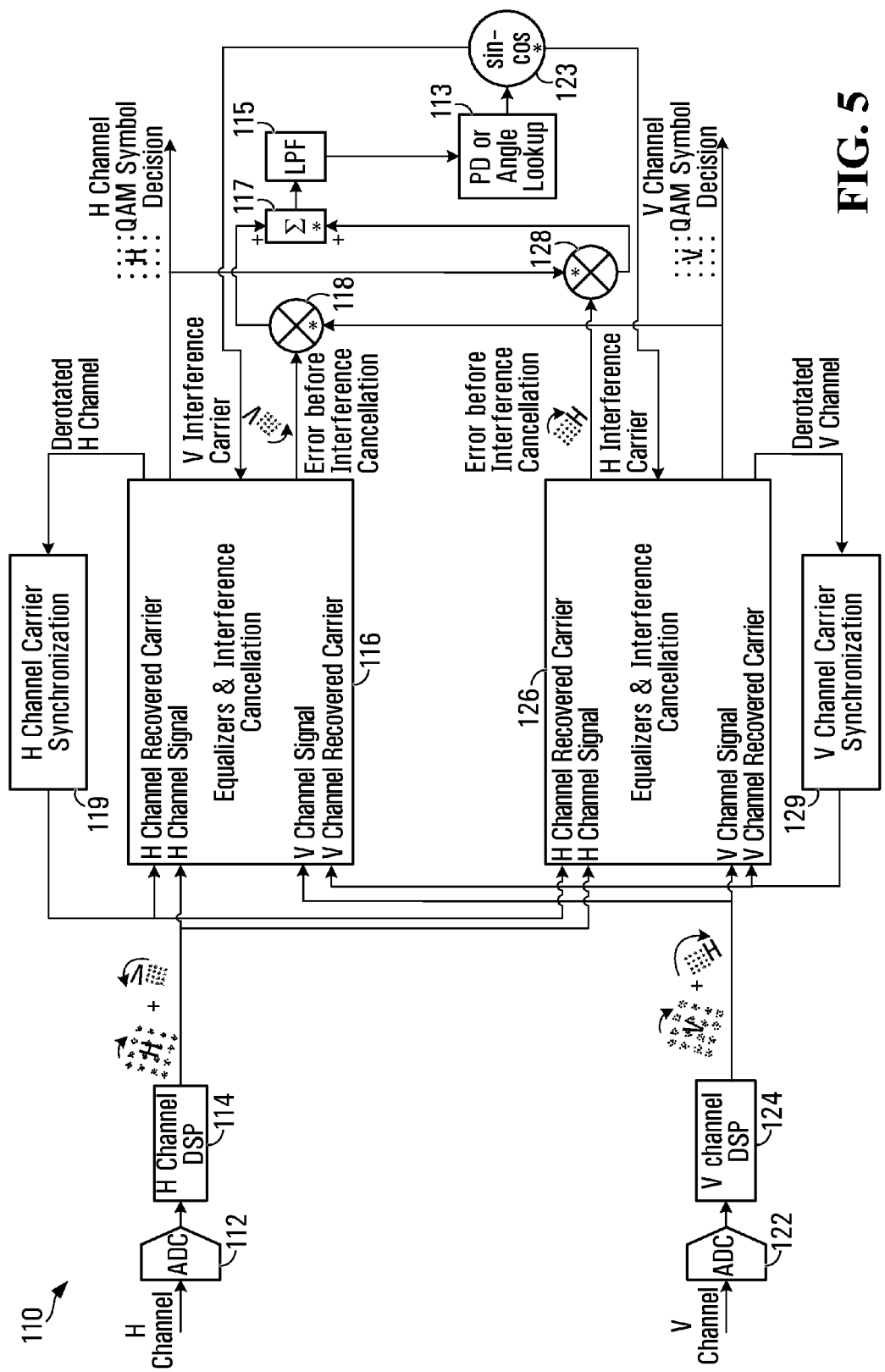
FIG. 5 is a block diagram of an example XPIC demodulator.

FIG. 5 is a block diagram of an example XPIC demodulator 110, which includes an Analog to Digital Converter (ADC) 112, 122, a Digital Signal Processor (DSP) 114, 124, an equalizer and interference cancellation module 116, 126, and a carrier synchronization system 119, 129 for each of H and V channels. An interference carrier regenerator is also shown, and includes complex conjugate multipliers 118, 128, a complex conjugate adder 117, a low-pass filter (LPF) 115, a phase detector (PD) or angle lookup table 113, and a converter 123, which could be implemented as a sine-cosine generator (as shown) or polar-to-complex converter with unit magnitude and with conjugate outputs, for example.

The components are interconnected as shown. It should be appreciated that the example demodulator 110 of FIG. 5, as well as the contents of the other drawings, are intended solely for illustrative purposes, and that the present invention is in no way limited to the particular example embodiments explicitly shown in the drawings and described herein. For instance, the low-pass filter 115 could instead be implemented as a tracking bandpass filter.

Hardware, firmware, components which execute software, or some combination thereof might be used in implementing the various components shown in FIG. 5, and similarly FIGS. 6A and 6B described below. Electronic devices that may be suitable for this purpose include, among others, microprocessors, network processors, microcontrollers, PLDs (Programmable Logic Devices), FPGAs (Field Programmable Gate Arrays), ASICs (Application Specific Integrated Circuits), and other types of "intelligent" integrated circuits. Those skilled in the art may be familiar with many example implementations of these components. The form of interconnections between components will be implementation-dependent. In the case of hardware implementations, components could be interconnected through traces or other types of physical connections, whereas components implemented using processors or other devices which execute software stored in one or more memory devices could be interconnected through commonly accessible memory areas or registers, for instance.

The ADCs 112, 122 and the DSPs 114, 124 perform front-end processing of received communication signals. These signals include symbols, but are affected by LO frequency offset, mutual interference, and channel effects such as linear distortion, loss and noise. The LO frequency offsets are represented in FIG. 5 by rotation of the constellations, and interference is represented by the "additive" constellations shown on each of the H and V channel DSP 114, 124 outputs. The points in the constellations are not well defined at the outputs of the DSPs 114, 124, and this is intended to represent the channel effects.

The example demodulator 110 regenerates the cross-channel interference carriers. An error signal for the H channel is derived by subtracting the symbol decisions from the derotated H channel signal, before interference cancellation. This error signal, also termed "XPIC error", will consist largely of the V channel interference signal. Performing a complex conjugate multiplication of the error signal with the symbol decisions from the V channel at 118 generates a vector with the angle of the V channel interference relative to the derotated (zero degree) reference provided by the V channel symbol decisions. The same processing is applied at the V channel, using the V channel XPIC error signal and the H channel symbol decisions, to regenerate the H channel interference carrier.

Since one main objective of interference carrier regeneration is to provide interference carriers with higher SNRs than prior techniques, the outputs of the conjugate multipliers 118, 128 are added in a conjugate adder 117, with the input coming from multiplier 128 being conjugated in the example shown, to further increase the SNR. That is possible because the outputs of interest of the conjugate multipliers 118, 128 are oppositely-rotating complex carriers. The output of the conjugate adder 117 is filtered by the filter 115, and subsequently normalized to unit magnitude conjugate carriers. The normalization is effected by the PD or angle look-up table (LUT) 113 operating on the output of the filter 115, and the subsequent carrier regeneration by the sine-cosine generator 123 operating on that phase angle. In some embodiments, the phases of only certain magnitude symbols which do not suffer decision errors are selected by the PD or angle LUT 113 when the differential phase errors are large. The outputs from the PD or angle LUT are converted from angle to sine and cosine and negative sine functions by the sine-cosine generator 123, which could be another LUT. The output of the sine-cosine generator 123 which supplies the H interference carrier to the V channel equalizer and interference cancellation module 126 is conjugated in the example shown.

Conjugation of inputs and outputs as shown in FIG. 5 could be implemented separately from other functions or as part of those other functions. For example, conjugation could be implemented separately from the multipliers 118, 128, or as part of each multiplier. This would also apply to the adder 117 and the sine-cosine generator 123, for which conjugation could be performed separately or as part of each functional block or component, at the designated input or output port.

It should also be appreciated that conjugation of specific signals as shown in FIG. 5 is intended solely for the purposes of illustration. The other inputs of the multipliers 118, 128 and the adder 117 could instead be conjugated, and/or the other output of the sine-cosine generator 123 and the carrier inputs of the rotator multipliers 138/158 (FIGS. 6A and 6B) could be conjugated while those of derotators 146/166 would not be conjugated, provided all conjugations are applied in a consistent manner for these components. Other patterns of complex conjugations which are mathematically consistent with the above example are possible and may be applied by those skilled in the art.

Figure 6A:
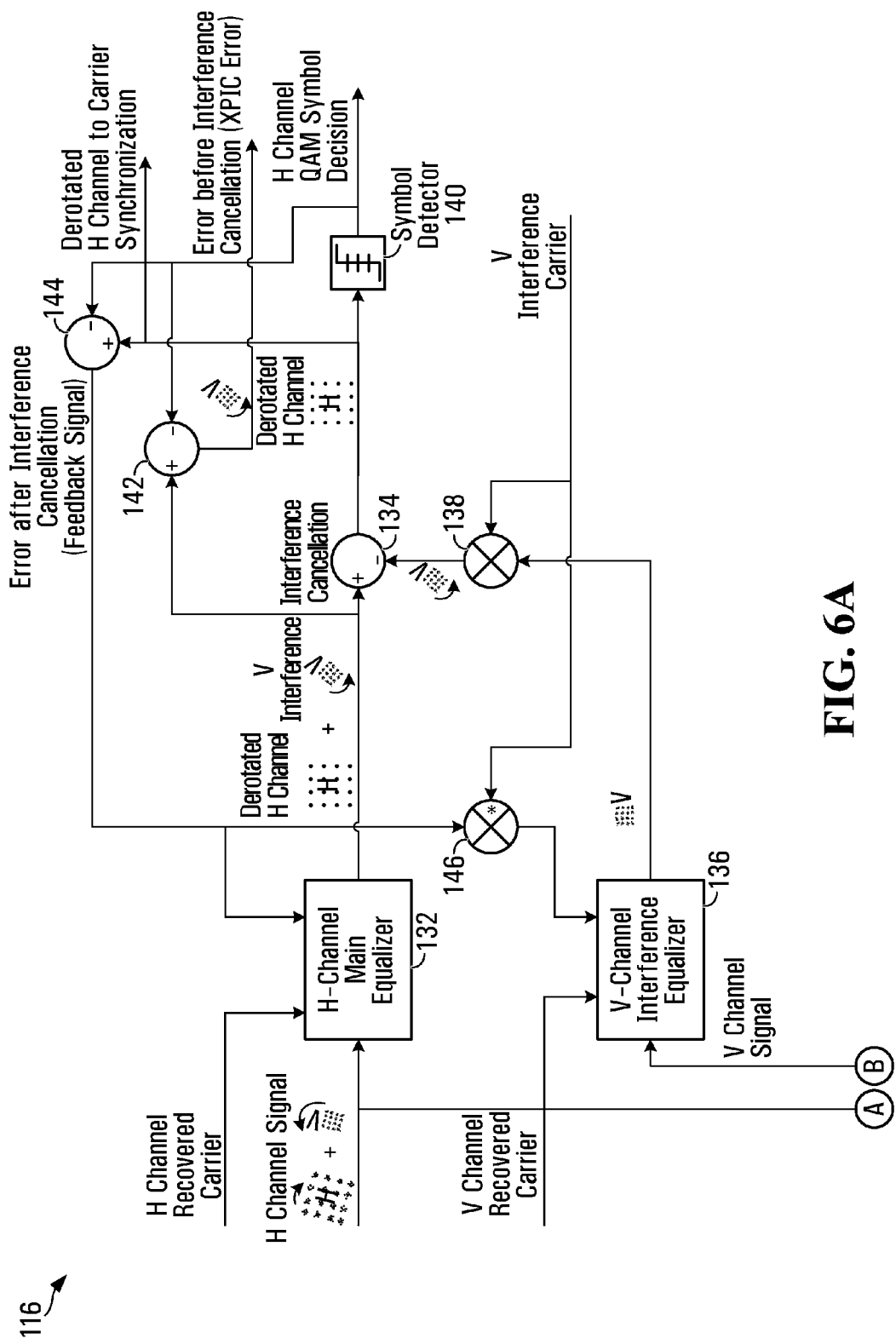
FIGS. 6A and 6B illustrate a block diagram of an example XPIC equalizer.
Figure 6B:
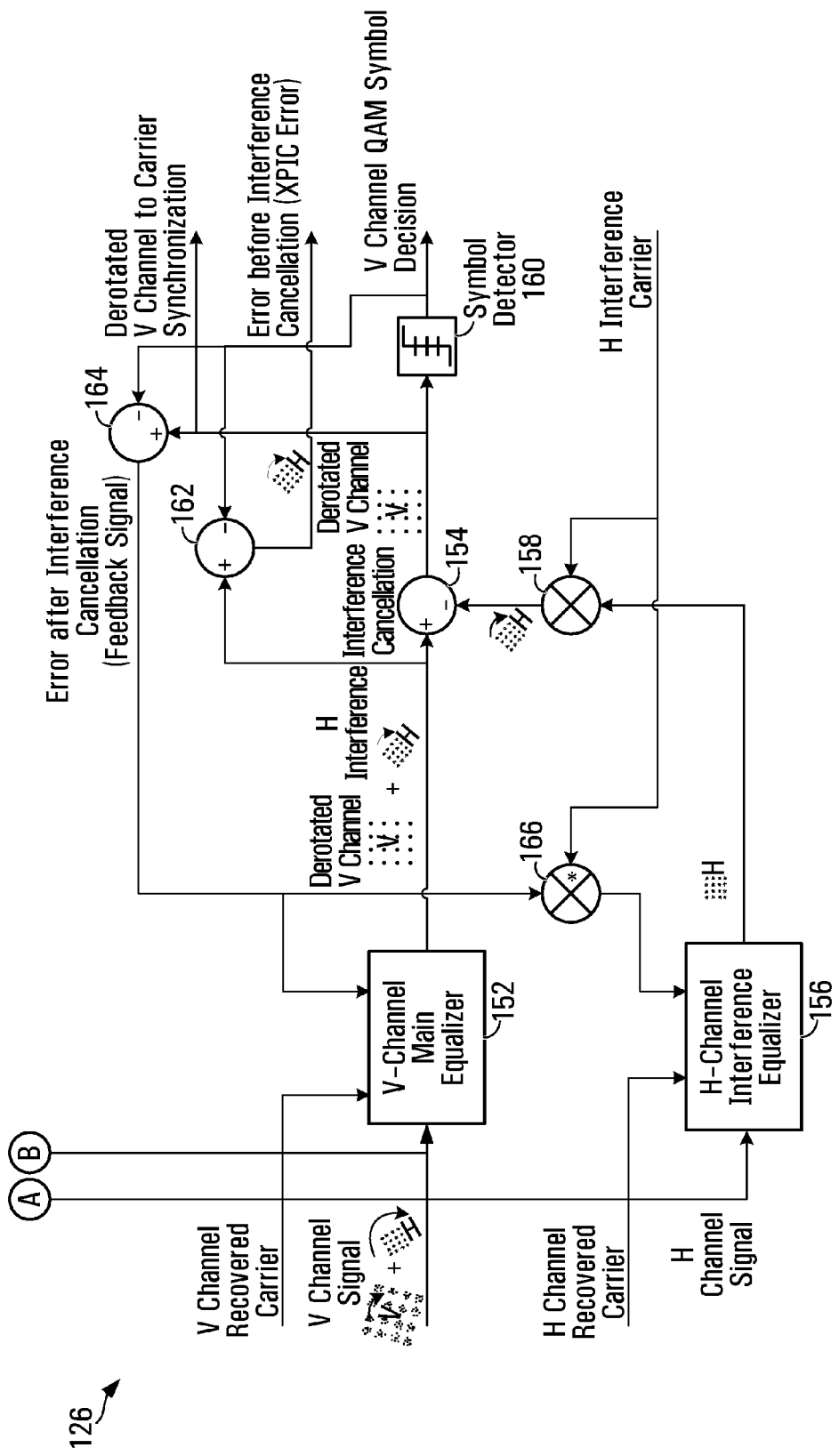

FIGS. 6A and 6B illustrate a block diagram of an example XPIC equalizer which could be implemented as the equalizer and interference cancellation modules 116, 126 in the example demodulator 110. The example XPIC equalizer implements both interference cancellation and tracking of independent frequency sources. As shown, the example XPIC equalizer includes main channel equalizers 132, 152, cross-channel equalizers shown as interference equalizers 136, 156, interference cancellers in the form of combiners 134, 154, interference signal generators in the form of complex multipliers 138, 158, symbol detectors 140, 160, XPIC error signal generators in the form of combiners 142, 162, main channel equalization feedback signal generators in the form of combiners 144, 164, and cross-channel equalization feedback signal generators in the form of complex conjugate multipliers 146, 166.

Each of the equalizers 132, 136, 152, 156 could be combined with a respective complex multiplier (not shown), so that constellation rotation can be performed using the recovered carriers from the carrier synchronization systems 119, 129 (FIG. 5). When the system is synchronized, the H main channel signal then appears derotated and equalized at the output of the H main channel equalizer 132. Any V cross-channel interference will appear with a frequency offset equal to the difference in frequency and phase noise between Tx LO1 and Tx LO2 (FIG. 2). Similarly, the V main channel signal, after the V main channel equalizer 152, will have an H cross-channel interferer with the same frequency offset, reversed in sign. Interference cancelling signals from the interference channel equalizers 136, 156 are rotated to match the frequency offset and phase noise of the interferers. Two complex multipliers 138/146, 158/166 are provided for each of the cross-coupling channels, including one 138, 158 to rotate the cancelling signal and one complex conjugate multiplier 146, 166 to derotate the main channel feedback signals to the interference channel equalizers 136, 156.

The cross-channel signal from the V cross-channel interference equalizer 136, for example, has been derotated as part of the cross-channel equalization process. The complex multiplier 138, which can be considered a form of rotator, rotates the cross-channel signal based on the V interference carrier for interference cancellation at 134. The purpose of this rotation is to match the frequency offset and phase noise of the V interference remaining in the equalized signal output from the H-channel main equalizer 132. The main channel feedback signal generated by the combiner 144 may include a component which results from remaining cross-channel interference from the V channel after interference cancellation. This feedback signal can thus be useful not only for feedback to the H-channel main equalizer 132, but also for feedback to the V cross-channel interference equalizer 136. However, before feeding the main channel feedback signal to the V cross-channel interference equalizer 136, that feedback signal is derotated based on the interference carrier, and actually its complex conjugate in the example shown, by the multiplier 146. The multiplier 146 thus acts as a form of derotator, and provides the derotated main channel feedback signal to the V cross-channel interference equalizer 136.

Rotation and derotation are provided in a similar manner for the V channel by the multipliers 158 and 166.

In FIGS. 6A and 6B, the H channel recovered carrier is applied to both the H channel main equalizer 132 and the H channel interference equalizer 156. The V channel recovered carrier is similarly applied to both the V channel main equalizer 152 and the V channel interference equalizer 136. This provides for derotated H channel components in the outputs of the equalizers 132, 156 and derotated V channel components in the outputs of the equalizers 152, 136 as shown in FIGS. 6A and 6B. This derotation could potentially be applied earlier in a receive path, before the channel signals are "split" for input to the equalization and interference cancellation modules 116, 126 in FIG. 5, for example. In any case, where such derotation is performed at some point prior to interference cancellation, derotated cross-channel interference components are rotated at 138, 158, and main channel feedback signals are derotated at 146, 166.

The example XPIC demodulator 110 (FIG. 5) and the XPIC equalizer in FIGS. 6A and 6B include respective interconnected processing paths for the H and V channels. Operation of these paths is described in further detail below with reference to FIGS. 5, 6A, and 6B. Considering the H channel path, for example, the combiner 142 is a form of error signal generator to generate an error signal before interference cancellation, termed the "XPIC error". The generated XPIC error signal is representative of a difference between a first signal and a first symbol decision from the symbol detector 140 that is based on the first signal. The first signal is derived from a first communication signal, namely the H main channel signal, that is received over a wireless communication link, and in the example shown in FIG. 6A is the signal at the output of the H main channel equalizer 132. As described above, the H channel communication signal is affected by interference from a second communication signal, which is the V cross-channel signal in this example. In one embodiment, the H and V main channel signals include symbols that are detected by the symbol detectors 140, 160.

An interference carrier regenerator includes the complex conjugate multiplier 118, as noted above. The conjugate multiplier 118 is operatively coupled to receive the XPIC error from the error signal generator 142, and is involved in regeneration of a carrier of interference that affects the first signal from the second communication signal. The H interference carrier is thus initially regenerated in the multiplier 118 from either a product of the XPIC error signal from the combiner 142 and the complex conjugate of the second symbol decision for the second communication signal from the symbol detector 160, or a product of the second symbol decision from the symbol detector 160 and the complex conjugate of the XPIC error signal from the combiner 142. FIG. 5 shows an example in which the symbol decision from the symbol detector 160 is conjugated. However, as noted above, in another embodiment the other input to the multiplier 118, namely the XPIC error signal, could be conjugated instead.

The regenerated H interference carrier and the complex conjugate of the V interference carrier which is initially regenerated in a similar manner at 128 are added in the conjugate adder 117 to increase the SNR of the regenerated carrier. It is subsequently filtered by the filter 115, which is a narrowband filter relative to symbol rate. The filter output is normalized to unit magnitude by the PD or angle LUT 113, which could also be considered a form of complex-to-polar converter. Optionally, the output of the PD or angle LUT 113 may be further configured to select phases of only certain magnitude symbols which do not suffer from decision errors when the phase noise of the interference carrier, which is the difference between the transmitter carriers at the other end of the link, is high, as part of the LUT function. The sine-cosine generator 123, which could be considered a form of polar-to-complex converter with unit magnitude, receives the output of the PD or angle LUT 113. The output of the sine-cosine generator 123 which feeds the equalizer and interference cancellation module 126 is conjugated as part of the function of the generator 123, although conjugation could be applied to the other output in some embodiments.

In the example shown, the regenerated complex interference carriers output by the sine-cosine generator 123 are used as the final regenerated interference carriers. In other embodiments, outputs from the multipliers 118, 128 could instead be used as the interference carriers, if instead of complex conjugation, they perform complex reciprocals instead of conjugation at the indicated ports. Thus, the components 117, 115, 113, 123 are optional, and might not be provided in all embodiments. The alternative complex-reciprocal multipliers can therefore be considered interference carrier regenerators, although in some embodiments the interference carriers that are regenerated by the multipliers 118, 128 may undergo further processing at 117, 115, 113, 123 to produce final regenerated interference carriers.

Interference cancellation is performed in the H channel processing path by an interference canceller in the form of the combiner 134, which subtracts an interference signal from the first signal. The interference signal is generated by an interference signal generator in the form of the complex multiplier 138, which provides a product of a cross-channel signal derived from the second communication signal and the V interference carrier to the interference canceller 134 as the interference signal.

The first signal, from which the interference signal is subtracted, is derived from the received H channel signal by the H main channel equalizer 132. The H main channel equalizer 132 performs main channel equalization of the H channel signal. In a similar manner, although using different coefficients due to the different channel characteristics between the H main channel and the H-V cross-coupling channel, the V interference channel equalizer 136 derives the cross-channel signal by performing cross-channel equalization of the received V main channel signal.

Both the H main channel equalizer 132 and the V interference channel equalizer 136 are adaptive in the example shown. A main channel feedback signal generator, in the form of the combiner 144, is operatively coupled to the interference canceller 134 and to the H main channel symbol detector 140, to provide a main channel feedback signal representative of a difference between an output of the interference canceller and the first symbol decision from the symbol detector 140 to the H main channel equalizer 132. For V cross-channel feedback, a V cross-channel feedback signal generator in the form of the complex conjugate multiplier 146 is operatively coupled to receive the H main channel feedback signal from the H main channel feedback signal generator 144 and to receive the V interference carrier, and has an output operatively coupled to the V channel interference equalizer 136. The complex conjugate multiplier 146 derotates the main channel feedback signal based on the V interference carrier and provides the derotated main channel feedback signal as a cross-channel feedback signal to the V channel interference equalizer 136. In the example shown, the cross-channel feedback signal is a product of the H main channel feedback signal from the combiner 144 and the complex conjugate of the V interference carrier. Although FIG. 6A illustrates conjugation of the V interference carrier, the H main channel feedback signal could instead be conjugated at the multiplier 146 in another embodiment, in which case the multiplier 146 would provide a product of the V interference carrier and the complex conjugate of the main channel feedback signal.

The corresponding components in the V channel processing path operate in a similar manner. The combiner 162 is a form of a second error signal generator to generate a second XPIC error signal representative of a difference between a second signal that is derived from the V channel signal and a second symbol decision, from the symbol detector 160, that is based on the second signal. The V channel signal is also affected by interference, but from the H channel signal. The complex conjugate multiplier 128 initially regenerates a second carrier of interference affecting the second signal from the H channel signal, from either a product of the second XPIC error signal from the combiner 162 and the complex conjugate of the first symbol decision from the symbol detector 140, or a product of the first symbol decision from the symbol detector 140 and the complex conjugate of the second XPIC error signal from the combiner 162. FIG. 5 illustrates conjugation of the symbol decision from the symbol detector 140, but as noted above, the other input to the multiplier 128, namely the second XPIC error signal, could be conjugated instead.

The interference carrier which is initially regenerated by the multiplier 128 may be further processed, with the interference carrier from the multiplier 118, at 117, 115, 113, and 123 as noted above.

In the V channel processing path, the combiner 154 is a form of interference canceller which subtracts a second interference signal from the second signal. The second interference signal is generated by a second interference signal generator, in the form of the complex multiplier 158, which is operatively coupled to the second interference canceller 154 and provides the second interference signal to the second interference canceller by rotating a second cross-channel signal derived from the H channel signal (i.e., the H cross-channel signal) based on the second interference carrier.

The V main channel equalizer 152 derives the second signal from the received V channel signal by performing main channel equalization of the V channel signal, and is operatively coupled to provide the second signal as an input to the second interference canceller 154. A second interference channel equalizer 156 is operatively coupled to provide the second cross-channel signal as an input to the complex multiplier 158, which acts as a second interference signal generator. The second interference channel equalizer 156 derives the second cross-channel signal (i.e., the H cross-channel signal) from the received H main channel signal by performing cross-channel equalization of the H main channel signal.

Feedback to the V main channel equalizer 152 is provided by a second main channel feedback generator in the form of the combiner 164, which is operatively coupled to receive an output of the second interference canceller 154 and the symbol decision from the symbol detector 160, and provides a V main channel feedback signal representative of a difference between an output of the second interference canceller and the second symbol decision from the symbol detector 160 to the V main channel equalizer. The complex conjugate multiplier 166 acts as a second cross-channel feedback signal generator in the example shown, to provide a product of the second main channel feedback signal and the complex conjugate of the second interference carrier to the H interference channel equalizer 156 as an H cross-channel feedback signal. This effectively rotates the V main channel feedback signal based on the H interference carrier, for feedback to the H cross-channel interference equalizer 156.

Although the example described in detail above uses "first" in reference to the H channel signals and processing path components and "second" in reference to the V channel signals and processing path components, it should be noted that the "first" and "second" labels are intended simply to differentiate signals and processing path components, and not to specifically designate signals or processing components associated with only the H channel or only the V channel.

The foregoing description of FIGS. 5, 6A and 6B concentrates primarily on interference carrier regeneration. It should be noted that embodiments of the invention also encompass interference signal rotation and cross-channel interference equalizer feedback signal derotation. FIG. 6A, for example, shows an interference canceller in the form of the combiner 134, which is operatively coupled to receive a main channel equalized signal from the main channel adaptive equalizer 132 and to subtract an interference signal from the main channel equalized signal. A rotator, in the form of the complex multiplier 138, is operatively coupled to receive a cross-channel equalized signal from the cross-channel interference adaptive equalizer 136, to rotate the cross-channel equalized signal, and to provide the rotated cross-channel signal to the interference canceller 134 as the interference signal. The complex conjugate multiplier 146 is a form of derotator and is operatively coupled to receive a main channel feedback signal that is provided to the main channel adaptive equalizer 132 from the combiner 144, to derotate the main channel feedback signal, and to provide the derotated main channel feedback signal to the cross-channel interference adaptive equalizer 136 as a cross-channel feedback signal. A similar arrangement is shown in FIG. 6B, including the equalizers 152, 156, the combiner 154, and the multipliers 158, 166.

Variations of the specific examples shown in FIGS. 5, 6A, and 6B are contemplated. For instance, it might be possible to perform some pre-alignment of LOs and/or interference cancellation at a transmit side of a radio link. This might be appropriate where cross-coupling parameters are fixed or where a feedback loop is provided between the receive and transmit ends.

In some implementations, there could potentially be different propagation delays between the H and V channels. This could be handled by detecting propagation delays at the main channel equalizers 132, 152 and adding delays at the complex multipliers 138, 158, for example, in order to match received symbols with corresponding interference signals.

Other features such as selecting phases from symbols within only a certain range of magnitudes for phase estimation at 113 could also or instead be provided. Further variations might also be or become apparent to those skilled in the art.

Figure 7:
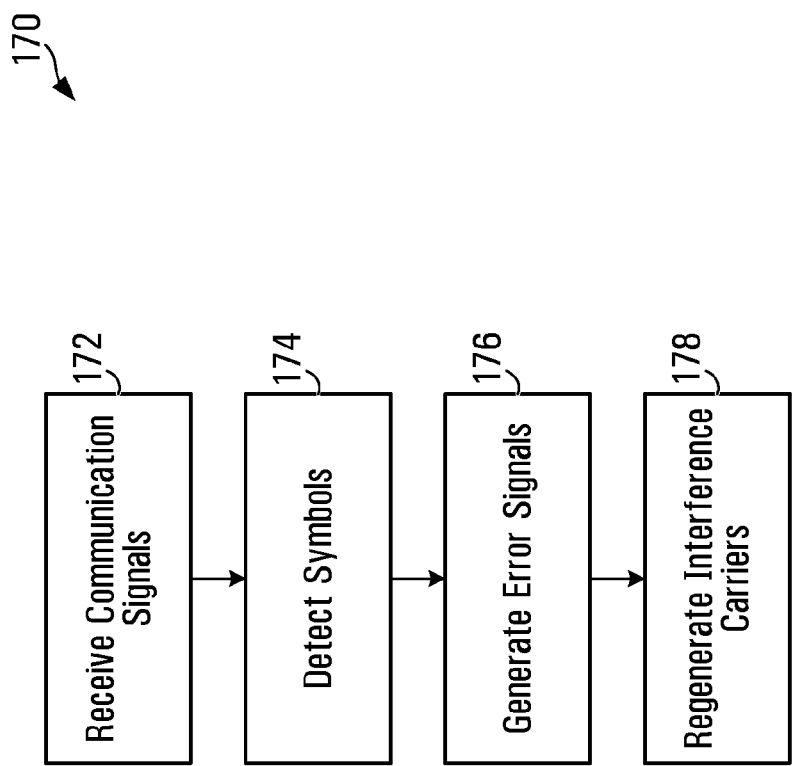
FIG. 7 is a flow diagram illustrating an example method.

Embodiments of the invention have been described above primarily in terms of example apparatus implementations. Different implementations are also contemplated, in the form of methods, for example. FIG. 7 is a flow diagram illustrating an example method.

The example method 170 involves receiving communication signals from a wireless communication link at 172. Each of these communication signals includes symbols, but is affected by interference from the other communication signal. Symbols are detected at 174, from signals that are derived from the received communication signals.

An XPIC error signal representative of a difference between a first signal that is derived from a first received communication signal and a first symbol decision that is based on the first signal, is generated at 176. A carrier of interference affecting the first signal from the second communication signal is regenerated at 178, from either a product of the XPIC error signal generated at 176 and the complex conjugate of a second symbol decision for the second communication signal, or a product of the second symbol decision and the complex conjugate of the XPIC error signal. The operations at 176, 178 are also repeated for the second communication signal in some embodiments.

It should be appreciated that the example method 170 is intended solely for the purposes of illustration, and relates to one embodiment of the invention. Other embodiments may include further, fewer, and/or different operations than those explicitly shown. For example, various ways in which the illustrated operations could be performed, as well as additional operations such as interference cancellation, equalization, and feedback, will be apparent from FIGS. 5, 6A, and 6B and the foregoing descriptions thereof.

The operation of receiving communication signals at 172, for instance, could involve performing main channel equalization of a first communication signal on a first channel of a pair of orthogonal polarization channels to generate a main channel equalized signal and performing cross-channel equalization of a second communication signal on a second channel of the pair of orthogonal polarization channels to generate a cross-channel equalized signal. An interference carrier regenerated at 178 could be used to rotate the cross-channel equalized signal to generate an interference signal to be subtracted from the main channel equalized signal, and to derotate a main channel feedback signal that is provided to the main channel adaptive equalizer. The derotated main channel feedback signal could then be provided to the cross-channel interference adaptive equalizer as a cross-channel feedback signal.

In contrast to prior techniques, embodiments of the invention as disclosed herein make use of demodulated symbols of an opposite or cross channel for synchronizing interference-cancelling effects in a main channel, and vice-versa. Embodiments of the present invention also do not rely on PLLs to extract the synchronizing carrier difference, thus potentially resulting in a much quicker and cleaner synchronization and resultant interference cancellation than in prior techniques.

What has been described is merely illustrative of the application of principles of embodiments of the invention. Other arrangements and methods can be implemented by those skilled in the art without departing from the scope of the present invention.

For example, the embodiments described in detail above related to H and V orthogonal polarized channels and QAM symbols. Other embodiments could potentially be implemented in conjunction with other types of interfering signals and/or modulation schemes.

In addition, although described primarily in the context of apparatus and methods, other implementations are also contemplated, as computer-executable instructions stored on a non-transitory computer-readable memory medium, for example.

I claim:

1. An apparatus comprising:
   an error signal generator to generate a Cross Polarization Interference Cancellation (XPIC) error signal representative of a difference between a first signal that is derived from a first communication signal received over a wireless communication link and a first symbol decision that is based on the first signal, the first communication signal being affected by interference from a second communication signal, the first and second communication signals comprising symbols; and
   an interference carrier regenerator, operatively coupled to the error signal generator, to regenerate, based on the XPIC error signal and a second symbol decision for the second communication signal, a carrier of interference affecting the first signal from the second communication signal.

2. The apparatus of claim 1, further comprising:
   an interference canceller to subtract an interference signal from the first signal; and
   an interference signal generator, operatively coupled to receive a cross-channel signal derived from the second communication signal, to rotate the cross-channel signal based on the regenerated interference carrier, and to provide the rotated cross-channel signal to the interference canceller as the interference signal.

3. The apparatus of claim 1, further comprising:
   a first symbol detector, operatively coupled to the error signal generator, to generate the first symbol decision and to provide the first symbol decision to the error signal generator; and
   a second symbol detector, operatively coupled to the interference carrier regenerator, to generate the second symbol decision and to provide the second symbol decision to the error signal generator.

4. The apparatus of claim 2, further comprising:
   a main channel equalizer, operatively coupled to the interference canceller, to derive the first signal from the first communication signal by performing main channel equalization of the first communication signal and to provide the first signal to the interference canceller.

5. The apparatus of claim 4, further comprising:
   a cross-channel interference equalizer, operatively coupled to the interference signal generator, to derive the cross-channel signal from the second communication signal by performing cross-channel equalization of the second communication signal and to provide the cross-channel signal to the interference signal generator.

6. The apparatus of claim 4, further comprising:
   a main channel feedback signal generator, operatively coupled to receive the first symbol decision and an output of the interference canceller and to provide to the main channel equalizer a main channel feedback signal representative of a difference between the output of the interference canceller and the first symbol decision.

7. The apparatus of claim 5, further comprising:
   a main channel feedback signal generator, operatively coupled to receive the first symbol decision and an output of the interference canceller and to provide to the main channel equalizer a main channel feedback signal representative of a difference between the output of the interference canceller and the first symbol decision; and
   a cross-channel feedback signal generator, operatively coupled to receive the main channel feedback signal, to derotate the main channel feedback signal based on the regenerated interference carrier, and to provide the derotated main channel feedback signal to the cross-channel interference equalizer as a cross-channel feedback signal.

8. The apparatus of claim 1, further comprising:
   a second error signal generator to generate a second XPIC error signal representative of a difference between a second signal that is derived from the second communication signal and a second symbol decision that is based on the second signal, the second communication signal being affected by interference from the first communication signal; and
   a second interference carrier regenerator, operatively coupled to the second error signal generator, to regenerate, based on the second XPIC error signal and the first symbol decision, a second carrier of interference affecting the second signal from the first communication signal.

9. The apparatus of claim 2, further comprising:
a second error signal generator to generate a second XPIC error signal representative of a difference between a second signal that is derived from the second communication signal and a second symbol decision that is based on the second signal, the second communication signal being affected by interference from the first communication signal;
a second interference carrier regenerator, operatively coupled to the second error signal generator, to regenerate, based on the second XPIC error signal and the first symbol decision, a second carrier of interference affecting the second signal from the first communication signal;
a second interference canceller to subtract a second interference signal from the second signal; and
a second interference signal generator, operatively coupled to receive a second cross-channel signal derived from the first communication signal, to rotate the second cross-channel signal based on the regenerated second interference carrier, and to provide the rotated second cross-channel signal to the second interference canceller as the second interference signal.

10. The apparatus of claim 8, further comprising:
a first symbol detector, operatively coupled to the error signal generator and to the second interference carrier regenerator, to generate the first symbol decision and to provide the first symbol decision to the error signal generator and to the second interference carrier regenerator; and
a second symbol detector, operatively coupled to the interference carrier regenerator and to the second error signal generator, to generate the second symbol decision and to provide the second symbol decision to the interference carrier regenerator and to the second error signal generator.

11. The apparatus of claim 9, further comprising:
a first main channel equalizer, operatively coupled to the interference canceller, to derive the first signal from the first communication signal by performing main channel equalization of the first communication signal and to provide the first signal to the interference canceller; and
a second main channel equalizer, operatively coupled to the second interference canceller, to derive the second signal from the second communication signal by performing main channel equalization of the second communication signal and to provide the second signal to the second interference canceller.

12. The apparatus of claim 11, further comprising:
a first cross-channel interference equalizer, operatively coupled to the interference signal generator, to derive the cross-channel signal from the second communication signal by performing cross-channel equalization of the second communication signal and to provide the cross-channel signal to the interference signal generator; and
a second cross-channel interference equalizer, operatively coupled to the second interference signal generator, to derive the second cross-channel signal from the first communication signal by performing cross-channel equalization of the first communication signal and to provide the second cross-channel signal to the second interference signal generator.

13. The apparatus of claim 8, the first communication signal and the second communication signal comprising signals on respective orthogonal polarizations of the same nominal frequency channel of the wireless communication link.

14. The apparatus of claim 11, further comprising:
a first main channel feedback signal generator, operatively coupled to receive the first symbol decision and an output of the interference canceller and to provide to the first main channel equalizer a first main channel feedback signal representative of a difference between the output of the interference canceller and the first symbol decision; and
a second main channel feedback signal generator, operatively coupled to receive the second symbol decision and an output of the second interference canceller and to provide to the second main channel equalizer a second main channel feedback signal representative of a difference between the output of the second interference canceller and the second symbol decision.

15. The apparatus of claim 12, further comprising:
a first main channel feedback signal generator, operatively coupled to receive the first symbol decision and an output of the interference canceller and to provide to the first main channel equalizer a first main channel feedback signal representative of a difference between the output of the interference canceller and the first symbol decision;
a second main channel feedback signal generator, operatively coupled to receive the second symbol decision and an output of the second interference canceller and to provide to the second main channel equalizer a second main channel feedback signal representative of a difference between an output of the second interference canceller and the second symbol decision;
a first cross-channel feedback signal generator, operatively coupled to receive the first main channel feedback signal, to derotate the first main channel feedback signal based on the regenerated interference carrier, and to provide the derotated first main channel feedback signal to the first cross-channel interference equalizer as a first cross-channel feedback signal; and
a second cross-channel feedback signal generator, operatively coupled to receive the second main channel feedback signal, to derotate the second main channel feedback signal based on the regenerated second interference carrier, and to provide the derotated second main channel feedback signal to the second cross-channel interference equalizer as a second cross-channel feedback signal.

16. The apparatus of claim 8,
the interference carrier regenerator regenerating the interference carrier from a product of the XPIC error signal and the complex reciprocal of the second symbol decision,
the second interference carrier regenerator regenerating the second interference carrier from a product of the second XPIC error signal and the complex reciprocal of the first symbol decision.

17. The apparatus of claim 8,
the interference carrier regenerator regenerating the interference carrier from either a product of the XPIC error signal and the complex conjugate of the second symbol decision or a product of the second symbol decision and the complex conjugate of the XPIC error signal,
the second interference carrier regenerator regenerating the second interference carrier from either a product of the second XPIC error signal and the complex conjugate of the first symbol decision or a product of the first symbol decision and the complex conjugate of the second XPIC error signal, the interference carrier regenerator and the second interference carrier regenerator respectively using the complex conjugates of the second symbol decision and the first symbol decision, or respectively using the complex conjugates of the XPIC error signal and the second XPIC error signal in regenerating the interference carrier and the second interference carrier, the apparatus further comprising:
a complex conjugate adder operatively coupled to receive outputs of the interference carrier regenerator and the second interference carrier regenerator;
a filter operatively coupled to receive an output of the complex conjugate adder;
a phase detector operatively coupled to receive an output of the filter and to determine a phase associated with the filter output; and
a converter operatively coupled to receive an output of the phase detector and to convert a phase from the phase detector output into a regenerated complex interference carrier and its complex conjugate,
the complex conjugate adder adding the output of the interference carrier regenerator and the complex conjugate of the output of the second interference carrier regenerator, the converter providing the regenerated complex interference carrier as the interference carrier, and the converter providing the complex conjugate of the regenerated complex interference carrier as the second interference carrier where the interference carrier regenerator and the second interference carrier regenerator respectively use the complex conjugates of the second symbol decision and the first symbol decision,
the complex conjugate adder adding the complex conjugate of the output of the interference carrier regenerator and the output of the second interference carrier regenerator, the converter providing the regenerated complex interference carrier as the interference carrier, and the converter providing the complex conjugate of the regenerated complex interference carrier as the second interference carrier where the interference carrier regenerator and the second interference carrier regenerator respectively use the complex conjugates of the XPIC error signal and the second XPIC error signal.

18. A method comprising:
generating a Cross Polarization Interference Cancellation (XPIC) error signal representative of a difference between a first signal that is derived from a first communication signal received over a wireless communication link and a first symbol decision that is based on the first signal, the first communication signal being affected by interference from a second communication signal, the first and second communication signals comprising symbols; and
regenerating, based on the XPIC error signal and a second symbol decision for the second communication signal, a carrier of interference affecting the first signal from the second communication signal.

19. The method of claim 18, further comprising:
rotating a cross-channel signal derived from the second communication signal based on the regenerated interference carrier; and
subtracting the rotated cross-channel signal from the first signal.

20. The method of claim 19, further comprising:
performing main channel equalization of the first communication signal to derive the first signal from the first communication signal.

21. The method of claim 20, further comprising:
performing cross-channel equalization of the second communication signal to derive the cross-channel signal from the second communication signal.

22. The method of claim 20, further comprising:
providing a main channel feedback signal, representative of a difference between a result of the subtracting and the first symbol decision, for the main channel equalization.

23. The method of claim 21, further comprising:
providing a main channel feedback signal, representative of a difference between a result of the subtracting and the first symbol decision, for the main channel equalization;
derotating the main channel feedback signal based on the regenerated interference carrier; and
providing the derotated main channel feedback signal as a cross-channel feedback signal for the cross-channel equalization.

24. The method of claim 18, further comprising:
generating a second XPIC error signal representative of a difference between a second signal that is derived from the second communication signal and a second symbol decision that is based on the second signal, the second communication signal being affected by interference from the first communication signal; and
regenerating, based on the second XPIC error signal and the first symbol decision, a second carrier of interference affecting the second signal from the first communication signal.

25. The method of claim 19, further comprising:
generating a second XPIC error signal representative of a difference between a second signal that is derived from the second communication signal and a second symbol decision that is based on the second signal, the second communication signal being affected by interference from the first communication signal;
regenerating, based on the second XPIC error signal and the first symbol decision, a second carrier of interference affecting the second signal from the first communication signal;
rotating a second cross-channel signal derived from the first communication signal based on the regenerated second interference carrier; and
subtracting the rotated second cross-channel signal from the second signal.

26. The method of claim 25, further comprising:
performing main channel equalization of the first communication signal to derive the first signal from the first communication signal;
performing main channel equalization of the second communication signal to derive the second signal from the second communication signal.

27. The method of claim 26, further comprising:
performing cross-channel equalization of the second communication signal to derive the cross-channel signal from the second communication signal; and
performing cross-channel equalization of the first communication signal to derive the second cross-channel signal from the first communication signal.

28. The method of claim 27, further comprising:
providing a first main channel feedback signal, representative of a difference between the first symbol decision and a result of subtracting the interference signal from the first signal, for the main channel equalization of the first communication signal;

providing a second main channel feedback signal, representative of a difference between the second symbol decision and a result of subtracting the second interference signal from the second signal, for the main channel equalization of the second communication signal;

derotating the first main channel feedback signal based on the regenerated interference carrier;

providing the derotated first main channel feedback signal as a first cross-channel feedback signal for the cross-channel equalization of the second communication signal;

derotating the second main channel feedback signal based on the regenerated second interference carrier; and providing the derotated second main channel feedback signal as a second cross-channel feedback signal for the cross-channel equalization of the first communication signal.

29. The method of claim 24, the regenerating of the interference carrier comprising regenerating the interference carrier from a product of the XPIC error signal and the complex reciprocal of the second symbol decision, the regenerating of the second interference carrier comprising regenerating the second interference carrier from a product of the second XPIC error signal and the complex reciprocal of the first symbol decision.

30. The method of claim 24, the regenerating of the interference carrier comprising regenerating the interference carrier from either a product of the XPIC error signal and the complex conjugate of the second symbol decision or a product of the second symbol decision and the complex conjugate of the XPIC error signal, the regenerating of the second interference carrier comprising regenerating the second interference carrier from either a product of the second XPIC error signal and the complex conjugate of the first symbol decision or a product of the first symbol decision and the complex conjugate of the second XPIC error signal, the regenerating of the interference carrier and the regenerating of the second interference carrier respectively using the complex conjugates of the second symbol decision and the first symbol decision, or respectively using the complex conjugates of the XPIC error signal and the second XPIC error signal.

31. An apparatus comprising:

a main channel adaptive equalizer for performing main channel equalization of a first communication signal on a first channel of a pair of orthogonal polarization channels;

a cross-channel interference adaptive equalizer for performing cross-channel equalization of a second communication signal on a second channel of the pair of orthogonal polarization channels;

an interference canceller operatively coupled to receive a main channel equalized signal from the main channel adaptive equalizer and to subtract an interference signal from the main channel equalized signal;

a rotator operatively coupled to receive a cross-channel equalized signal from the cross-channel interference adaptive equalizer, to rotate the cross-channel equalized signal, and to provide the rotated cross-channel signal to the interference canceller as the interference signal; and a derotator operatively coupled to receive a main channel feedback signal that is provided to the main channel adaptive equalizer, to derotate the main channel feedback signal, and to provide the derotated main channel feedback signal to the cross-channel interference adaptive equalizer as a cross-channel feedback signal.

32. A method comprising:

performing main channel equalization of a first communication signal on a first channel of a pair of orthogonal polarization channels to generate a main channel equalized signal;

performing cross-channel equalization of a second communication signal on a second channel of the pair of orthogonal polarization channels to generate a cross-channel equalized signal;

rotating the cross-channel equalized signal to generate an interference signal;

subtracting the interference signal from the main channel equalized signal;

derotating a main channel feedback signal that is provided to the main channel adaptive equalizer; and providing the derotated main channel feedback signal to the cross-channel interference adaptive equalizer as a cross-channel feedback signal.

* * * * *